Figure 1:
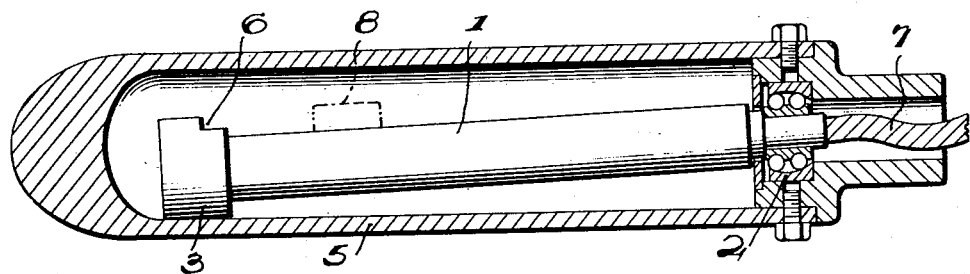

June 17, 1947.          H. S. WENANDER                 2,422,639
                        VIBRATING DEVICE
                      Filed Dec. 16, 1944

Inventor

Harald Svenning Wenander.
By Cameron, Kerkam & Sutton
                Attorneys

Patented June 17, 1947

2,422,639

UNITED STATES PATENT OFFICE 2,422,639

VIBRATING DEVICE

Harald Svenning Wenander, Riksby, Stockholm, Sweden, assignor to Vibro-Plus Corporation, Wilmington, Del., a corporation of Delaware Application December 16, 1944, Serial No. 568,504
In Sweden November 17, 1943

4 Claims. (Cl. 259--1)

The present invention relates to certain useful improvements in vibrating devices of the kind described in the U. S. Patent No. 2,194,410 with the object in view of eliminating certain disadvantages connected with the use of said devices as well as to provide an implement which, if desired, may be employed for producing vibrations with several simultaneous frequencies.

The vibrating device according to the U. S. Patent No. 2,194,410 in principle consists of a so called conical pendulum the outer end of which is provided with a weighted member shaped as a body of revolution and provided with an inner or outer circular surface (surface of revolution) which may be brought into contact with a corresponding circular surface belonging to the so-called vibrating member which also supports the pendulum by means of a bearing at its inner end, so that the pendulum when spun around its axis will perform a planetary motion in regard to the vibrating member while rolling on said circular surface of the same, thereby causing the device to vibrate with a high frequency the magnitude of which is a function of the diameters of the two cooperating circular surfaces and the revolving speed of the shaft of the pendulum.

A disadvantage when using such vibrators has hitherto been that the pendulum must be brought to start its planetary motion by receiving an impact of such size in the direction of the rolling surface that it will not slide on this surface but instead "grip" so that the rolling motion will begin. Once this has started the centrifugal force will be large enough to keep the pendulum in permanent contact with the corresponding surface on the casing so that the desired planetary motion will continue and cause the implement to vibrate, so long as the pendulum is kept spinning around its axis. When using such vibrating devices in the form of so called rod-vibrators for direct immersion in plastic masses, such as concrete, for vibrating the same, there is thus the disadvantage that the vibrator must be pulled out of the mass each time an interruption of the operation takes place, e. g. caused by an occasional breaking of the electric circuit to the motor which keeps the pendulum spinning, and be given an impact, e. g. a kick by the foot, in order to resume its vibrating action when the pendulum is again brought into spinning. Since the concrete is usually very stiff when the vibrator is out of action and only becomes plastic under the influence of the vibrations, it is evident that the pulling out of the device when it is not vibrating, will often be quite a tedious task.

In the case of heavier implements, e. g. so called plane vibrators where the casing is replaced by a flat surface acting on the surface of the concrete, as well as in the case of vibrators which are permanently attached to the implement to be vibrated, e. g. a mold or the like, the starting of the vibrator has also presented certain problems owing to the above mentioned necessity for giving the perfectly symmetrically built body of revolution (the pendulum) an impact in the direction of the surface on which it is to roll, in order to start the planetary motion of the pendulum which sets up vibrations in the apparatus.

According to the present invention the above related disadvantages are eliminated in a very simple way. It has been discovered that an unsymmetrical shape of the body of revolution which causes a corresponding increase of the centrifugal force at normal rotation of a vibrator-pendulum of a few per cent, e. g. about 2%, is quite sufficient to prevent sliding of the rotary member on its corresponding rolling surface. Such a slight deviation from symmetry of the pendulum is, on the other hand, without detrimental influence on the operating effect of the vibrating device. For example, in the case of the usual centrifugal action of about 300 kilograms for the above mentioned rod-vibrators this only means ±6 kilograms, which is not perceptible as an undue disturbance in the operation of the vibrator. According to the invention this unsymmetrically acting force on the spinning member is produced by providing some part of the pendulum, e. g. its shaft or preferably the outer end of the same which is built as a body of revolution, with a certain eccentricity in regard to the axis of the pendulum.

In the accompanying drawing the invention is explained by way of an example showing a suitable way of providing a rod-vibrator of the kind described in U. S. patent No. 2,194,410 with sufficient eccentricity to facilitate its starting.

Figure 2:
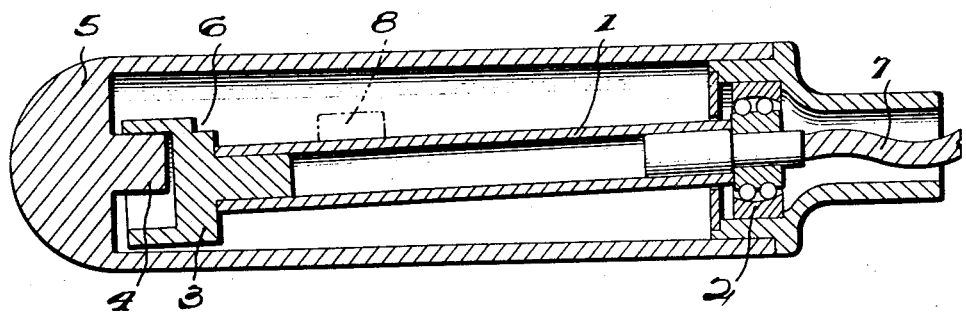

Fig. 1 is an axial sectional view, with certain parts shown in full, of one form of a vibrating device according to the invention in which the rotary member is arranged to roll on the inside surface of the vibrating member, and Fig. 2 a similar view of another embodiment in which the rotary member engages with the vibrating member by means of a projecting part on the latter, similar parts being denoted by similar numerals in the two figures.

The rigid shaft 1 of the pendulum is at its outer end provided with a weight in the form of a body of revolution 3 which according to Figure 1 rolls on the inside of the casing 5, and according to Figure 2 has an inner surface which engages with a circular surface 4 on a centrally projecting part on the inside of said casing 5, the net result in both cases being that the pendulum while rolling in contact with the vibrating member, i. e. the casing 5, will cause it to vibrate. Shaft 1 is at its inner end arranged in a bearing 2 supported by the member 5, so that the pendulum 1 and the casing or member 5 will form a closed system of vibration in a mechanical sense. The pendulum is caused to spin by means of the flexible shaft 7 which is driven by an electric motor. According to the invention the body of revolution (the so-called pendulum-weight) is suitably provided with a small groove or similar cut-out 6, so that a slight eccentricity is formed in regard to the shaft 1, which spins symmetrically in its bearing 2. Hereby the pendulum is influenced by an eccentrically acting centrifugal force which at the operating speed of revolution is sufficient to cause the spinning pendulum when starting the implement to be pulled out of a stable sliding position and to hit the circular surface 4 at some other point, after which the planetary rolling motion is set up without sliding.

Instead of being provided with a groove or the like 6 the body 3 or some other part of the pendulum may of course in some other suitable way be provided with the desired eccentricity in order to obtain a sufficiently uneven distribution of the rotating mass around the axis of the pendulum, e. g. by eccentrically attaching a mass 8 to the pendulum so that it will rotate together therewith, as shown with dotted lines in the figures on the drawing.

It is evident that the eccentricity may be chosen such that the starting impact according to the invention may be obtained at some other speed of revolution of the pendulum than the operating speed, although it is generally most suitable to adjust the eccentricity such that a sufficient but not unnecessarily strong impact is obtained at a speed which corresponds to the normal speed of revolution of the pendulum shaft and which preferably is slightly below the operating speed. This eccentricity is easily calculated for each separate case from the data for mass and speed of revolution of the pendulum.

If the eccentricity is made greater than about what is needed for starting impact, a frequency which is superimposed on the normal vibration frequency and which corresponds to the eccentricity will begin to make itself perceptible. As already indicated such a superimposed frequency is in the case of ordinary vibrators to be regarded as a disturbance which should be avoided by keeping the eccentricity within suitable limits, so that the increase of the centrifugal force which is caused by the unsymmetrical condition will at normal speed of revolution of the pendulum be limited to a few per cent of the normal centrifugal force. In certain cases, however, it may be desirable when vibrating masses which contain material with varying particle sizes to use a vibrating implement which simultaneously oscillates with several frequencies. Such an implement is according to the present invention obtained by giving the unsymmetry of the pendulum such a magnitude that the additional (superimposed) frequency will become of sufficient amplitude. In this case the vibrating device will thus produce vibratory impulses the resultant curve of which is composed of the impulse curve normally obtained by the planetary motion of the pendulum and the deforming impulses caused by the unsymmetry, which latter impulses are of the same frequency as the speed of revolution of the pendulum shaft. By changing the speed of revolution of the pendulum shaft it is thus possible to vary the frequencies with which the vibrating device operates.

The invention is not limited to the example shown in the drawing but applies to all types of vibrators described and claimed in the U. S. Patent 2,194,410 as well as vibrating devices of a similar nature as set forth in the foregoing.

I claim:

1. In a vibrating device, a vibratory member, a rotatable shaft having a weighted member adjacent one end thereof, a bearing for the other end of said shaft carried by said vibratory member, said weighted member having a surface of revolution contacting with a surface of revolution fixed relatively to said vibratory member, said bearing and shaft being so constructed and arranged that said weighted member forms the outer end of a conical pendulum rotatable about the axis of said shaft and movable circularly relative to the vibratory member, the mass of said conical pendulum being eccentric relative to the axis of said shaft, the eccentricity of said mass being of such magnitude that, when the shaft is rotated at approximately normal speed, sufficient centrifugal force is exerted on said pendulum to move the surface of revolution of said weighted member out of stable sliding contact, and into rolling contact, with the surface of revolution of said vibratory member.

2. A high frequency vibrator for vibrating plastic masses such as concrete and the like comprising a portable vibratory member adapted to be manually placed and maintained in contact with the mass to be vibrated, a rigid shaft rotatably supported at one end by said vibratory member, said shaft forming a conical pendulum having a surface of revolution contacting with a surface of revolution fixed relatively to said vibratory member, the mass of said conical pendulum being distributed eccentrically relatively to the axis of rotation of said shaft whereby a centrifugal force is produced to cause the pendulum when rotated near the operating speed of the vibrator to contact and remain in rolling contact with said surface of revolution of the vibratory member.

3. In a vibrating device, a vibratory casing, a shaft mounted at one end in said casing for rotation on its own axis and also for conical revolution from its point of support, a weighted member supported by said shaft and eccentrically arranged relative to the shaft axis, said member having a surface of revolution contacting with a surface of revolution fixed relatively to said vibratory casing, and means for rotating said shaft, the eccentricity of said weighted member being of such magnitude that, when the shaft is rotated at approximately normal speed, sufficient centrifugal force is exerted on said member to move its surface of revolution out of stable sliding contact, and into rolling contact, with the surface of revolution of said vibratory casing.

4. In a vibrating device, a vibratory casing, a shaft mounted at one end in said casing for rotation on its own axis and also for conical revolution from its point of support, a weighted member supported by said shaft and eccentrically arranged relative to the shaft axis, said shaft having near its other end a surface of revolution contacting with a surface of revolution fixed relatively to said vibratory casing, and means for rotating said shaft, the eccentricity of said weighted member being of such magnitude that, when the shaft is rotated at approximately normal speed, sufficient centrifugal force is exerted on said shaft to move its surface of revolution out of stable sliding contact, and into rolling contact, with the surface of revolution of said vibratory casing.

HARALD SVENNING WENANDER.

REFERENCES CITED

The following references are of record in the file of this patent:

UNITED STATES PATENTS

| Number | Name | Date |
| --- | --- | --- |
| 1,549,555 | Jorgensen | Aug. 11, 1925 |
| 2,194,410 | Svenson | Mar. 19, 1940 |
| 1,242,824 | Lindsay | Oct. 9, 1917 |
| 2,059,239 | Jackson | Nov. 3, 1936 |
| 2,204,007 | Baily | June 11, 1940 |
| 2,353,492 | O'Connor | July 11, 1944 |